United States Patent
Yoshiba et al.

(10) Patent No.: US 7,246,172 B2
(45) Date of Patent: Jul. 17, 2007

(54) STATIC DENSE MULTICAST PATH AND BANDWIDTH MANAGEMENT

(75) Inventors: Harumine Yoshiba, Kanauawa (JP); Shiwen Chen, Marlboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 868 days.

(21) Appl. No.: 10/455,833

(22) Filed: Jun. 6, 2003

(65) Prior Publication Data

US 2005/0038909 A1 Feb. 17, 2005

(51) Int. Cl.
*G06F 7/00* (2006.01)
(52) U.S. Cl. ............... 709/233; 709/220; 709/224; 370/216; 370/233
(58) Field of Classification Search ........... 709/238, 709/241, 218, 220, 226, 233; 701/202; 370/238, 370/351, 216, 230; 710/10
See application file for complete search history.

(56) References Cited

U.S. PATENT DOCUMENTS

| | | | |
|---|---|---|---|
| 6,314,093 B1 * | 11/2001 | Mann et al. | 370/351 |
| 6,362,836 B1 * | 3/2002 | Shaw et al. | 715/744 |
| 6,363,319 B1 * | 3/2002 | Hsu | 701/202 |
| 6,842,463 B1 * | 1/2005 | Drwiega et al. | 370/468 |
| 2003/0009582 A1 * | 1/2003 | Qiao et al. | 709/233 |
| 2005/0174934 A1 * | 8/2005 | Kodialam et al. | 370/216 |
| 2006/0067235 A1 * | 3/2006 | Acharya et al. | 370/238 |
| 2007/0008884 A1 * | 1/2007 | Tang | 370/230 |

OTHER PUBLICATIONS

"Core Based Tree (CBT) Multicast—Architectural Overview and Specification", Tony Ballardie, University College London, Internet Draft of Internet Engineering Task Force (IETF); Apr. 15, 1995, 36 pages.

"Approximation Algorithms for Directed Steiner Problems", Moses Charikar, et al., 15 pages.

"An Overview of Quality-of-Service Routing for the Next Generation High-Speed Networks: Problems and Solutions", Shigang Chen, et al., 19 pages.

"An Architecture for Wide-Area Multicast Routing", Stephen Deering, et al., 10 pages.

"The PIM Architecture for Wide-Area Multicast Routing", Stephen Deering, et al., 12 pages.

"Packing Steiner Trees: A Cutting Plane Algorithm and Computational Results", M. Grotschel, et al., 33 pages.

"Packing Steiner Trees: Polyhedral Investigations", M. Grotschel, et al., 29 pages.

"Packing Steiner Trees: Further Facets", M. Grotschel, et al., 20 pages.

"Packing Steiner Trees: Separation Algorithms", M. Grotschel, et al., 31 pages.

"Survey of Multicast Routing Algorithms and Protocols", Pragyansmita Paul, et al., 25 pages.

"The Multicast Packing Problem", Shiwen Chen, et al., 24 pages.

"Quality of Service Routing for Supporting Multimedia Applications", Zheng Wang, et al., 16 pages.

"An Iterative Algorithm for Delay-Constrained Minimum Cost Multicasting", Mehrdad Parsa, et al., 40 pages.

\* cited by examiner

*Primary Examiner*—Khanh Dinh
(74) *Attorney, Agent, or Firm*—Harness, Dickey & Pierce, PLC (57) ABSTRACT

Improved algorithms are provided for performing path management for a plurality of select data transmission sessions in a multicast network. The algorithms include: constructing a weighted graph which represents topology of the network; assigning load correlated costs to network links; and computing least cost paths for each of the data transmission sessions which accounts for global bandwidth utilization.

23 Claims, 7 Drawing Sheets

STATIC DENSE MULTICAST PATH AND BANDWIDTH MANAGEMENT

FIELD OF THE INVENTION

The present invention relates to multicast path and bandwidth management and, more particularly to improved global bandwidth optimization routing algorithms which adjust link cost to account for the load on a respective link.

BACKGROUND OF THE INVENTION

Multicast refers to the technology to deliver same data from one or more sources to many destinations. Depending on the number of sources in a session, multicast can be one-to-many or many-to-many. When disseminating data to multiple destinations, a source may establish separate unicast sessions to these destinations respectively. However, scalability and efficiency issues arise. Some data may have to be transmitted along certain network links many times. Thus, a multicast approach addresses these issues.

Multicast is a network layer service, which enables applications to disseminate data and information among multiple destinations efficiently. Network layer devices (usually, the routers) either forward multicast packets along pre-computed paths, or use multicast routing protocols to establish multicast paths (such as in IPv4, the DVMRP, MOSPF, PIM protocols). Although there were already quite a few works on network multicasting, such as the ST protocol, IP multicast thrives after Deering's pioneering works. Deering's IP multicast model includes an architecture of multicast groups, and protocols supporting layer-3 functions, such as membership management and routing. In a local area network, a host may use IGMP to announce its membership requests to join certain multicast groups and communicate with local routers and other hosts. Routers listen to IGMP messages to learn local membership information. With certain routing protocols, multicast packets can be forwarded across subnets.

Multicast routing protocols experienced several stages of protocol development. At first, protocols were developed to accommodate existing unicast protocols, such as RIP or OSPF. Respective protocols are DVMRP, and MOSPF. These protocols have been implemented in most of the routing and layer-3 products. For reasons such as scalability in wide area networks, routing protocols that build shared trees for a whole multicast group have been proposed after the above protocols that are based on source-rooted trees. CBT and PIM are such representative protocols. However, these routing protocols are basically best-effort. In other words, oblivious to quality of service (QoS) concerns. When taking QoS into consideration, constraints such as bandwidth and delay should be applied. The problem is usually termed as the constrained Steiner minimum tree problem. The basic idea is to find an unconstrained shortest path tree (SPT) first. If the end-to-end delay to any group member violates the delay bound, path from the source to that group member is replaced by a path with the least delay.

When a network has a large amount of multicast sessions as its main application traffic, there are many issues need to be addressed, including path management, fault tolerance, routing performance and QoS. The present invention address network resource management for such systems. The present invention focuses on path management which accounts for bandwidth constraints in multicast-intensive packet-based media delivery system, such as an IP-based surveillance network. In addition, the path management approach will minimize global bandwidth utilization for the network.

SUMMARY OF THE INVENTION

In accordance with the present invention, a method is provided for performing path management for a plurality of select data transmission sessions in a multicast network. The method includes: constructing a weighted graph which represents topology of the network; assigning a cost to each link in the network; determining a path for a given data transmission session based on link cost and bandwidth utilization; adjusting link cost associated with each link along the path, such that the adjusted link cost accounts for load on the respective link. The process is then repeated for each of the remaining data transmission sessions.

In another aspect of the present invention, an alternative method is provided for performing path management for a plurality of select data transmission sessions in a multicast network. The method includes: selecting one or more of the plurality of data transmission sessions; finding a Steiner tree for each select data transmission session, where each Steiner tree roots from a source node associated with a given select data transmission session and reaches each destination node associated with the given select data transmission; determining total bandwidth for each link; identifying a link where the total bandwidth of the identified link exceeds bandwidth capacity of the identified link; and adjusting link cost for at least one of the identified links. The process may be repeated until the total bandwidth for each link is less that the corresponding bandwidth capacity for each link or for a predefined number of iterations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
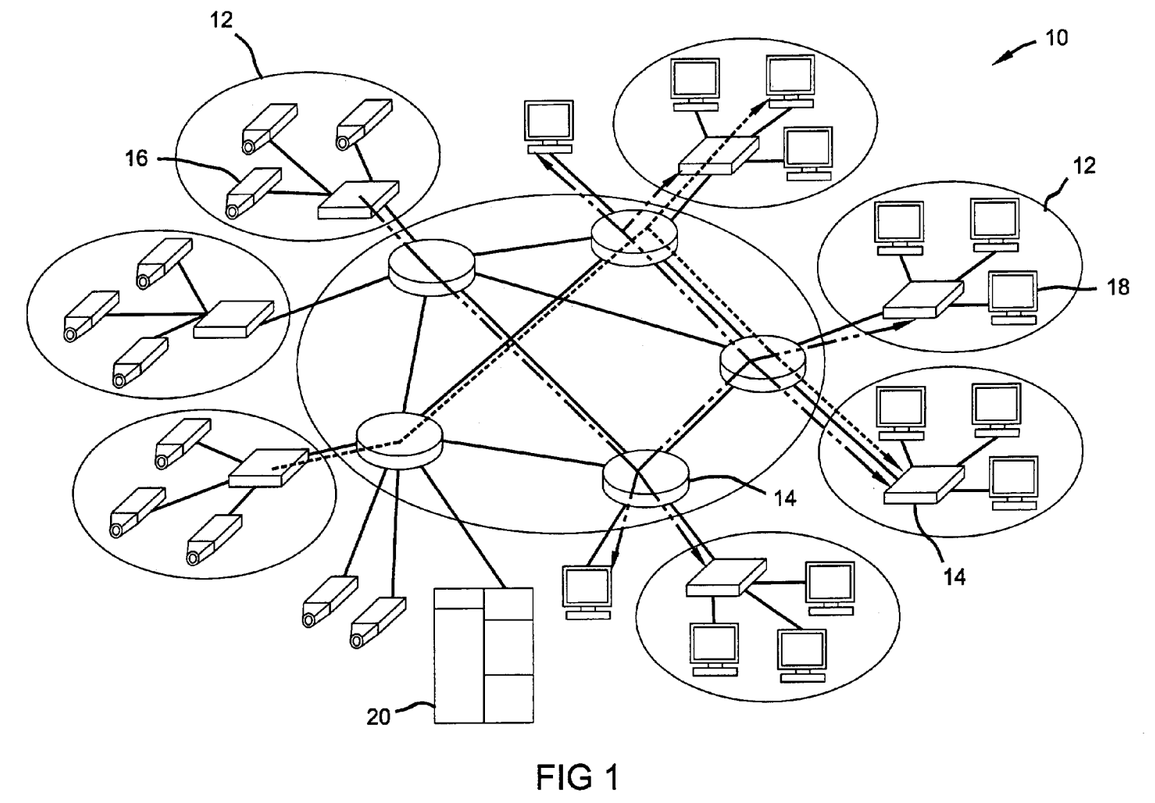
FIG. 1 depicts an exemplary multicast surveillance network.

FIG. 1 depicts an exemplary multicast surveillance network 10. The network is comprised of multiple network sites 12, which are interconnected to each other with routers or layer-3 switches 14. Each network site 12 may contain cameras 16 and/or monitors 18 which are either multicast sources or destinations. There is a path management server 20 which manages the routers to decide the delivery paths for the multicast flows between cameras and monitors. In general, the operation of the path management server 20 is as follows: determine the flows, determine the network topologies, compute all paths for the flows, and distribute computation results to all of the layer-3 switches 14.

One of the characteristics of such systems is bandwidth demanding. There are hundreds of flows of surveillance real-time video streams, real-time or non-real-time. Bandwidth becomes a precious resource of such network. Therefore, to efficiently utilize the network bandwidth is very important to control the network cost. For example, a good path management mechanism shall be able to minimize the capacity requirement on network links. In addition to the issue of large quantity of bandwidth-intensive flows, surveillance system sometimes may not be fully connected (i.e., not every pair of sites are directly connected) due to geographical limitations. Thus, bandwidth contentions may be more serious and bottlenecks may occur.

Given a network with limited bandwidth and a large amount of multicast flows, the present invention provides algorithms to compute the routing paths so that no links in the network are overflowed; and delivery paths for all flows are near optimum and the overall total bandwidth allocated to flows are minimized. Unlike routing protocols implemented for distributed and dynamic multicast routing, the proposed algorithms take into account some assumptions from the practical deployment scenarios. These assumptions include: a small network size, typically a surveillance network will comprise less than 10 routing nodes; hundreds of multicast flows, e.g., about 400; flows are pre-determined, i.e., all flows, their sources, destinations, and bandwidth requirements are known in advance of path computation; and paths are typically computed offline by the path management server. Using these assumptions, it becomes feasible to optimize routings globally to achieve minimized network bandwidth utilization. While the following description is provided with reference to a particular multicast surveillance network, it is readily understood that the present invention is applicable to other types of multicast networks which may demonstrate one or more of these assumptions.

Figure 2A:
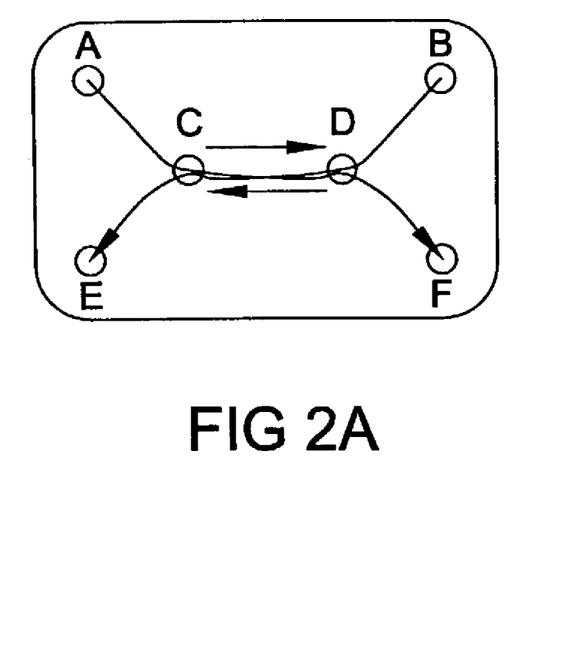
FIGS. 2A and 2B illustrates directed graph models which represent a fragmentary portion of the topology of an exemplary network.
Figure 2B:
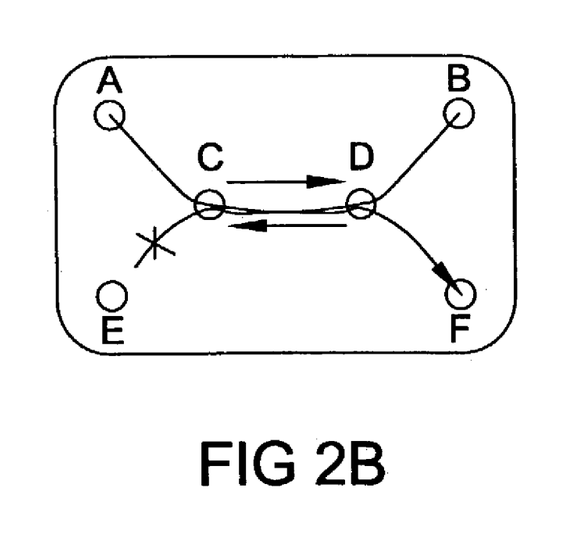

In general, a network can be viewed as a graph: G=(V, E), where V is a set of nodes and E is the set of links connecting these nodes. If there are n nodes and l links in the network, then |V|=n, and |E|=l. The network graph G can be undirected or directed, depending on the problems being studied. For illustration purposes, the directed model is chosen since we cannot ignore the fact of flows going through a link in different directions. Referring to FIG. 2, if link <C, D> has a bandwidth of 10 Mbps duplex, and suppose there are two flows that must go through link <C, D>: A->E and B->F, where each flow has a bandwidth requirement of 6 Mbps. It is obvious that these flows can be assigned. However, if the second flow is from E to B instead of from B to E, such that the flow must go via <C, D>, then we see that the second flow cannot be assigned successfully.

Network links are usually associated with certain functions, such as: cost c: E→$R^+$; capacity u: E→$R^+$; and delay d: E→$R^+$. Each of the above functions may be represented as a matrix of n×n, where:

Cost matrix: C={$c_{ij}$ ∈ $R^+$, i,j ∈ [1,n]},
Capacity matrix: U={$u_{ij}$ ∈ $R^+$, i,j ∈ [1, n]},
Latency matrix: D={$d_{ij}$ ∈ $R^+$, i,j ∈ [1, n]}.

Link state may be defined as a tuple of cost, capacity, and latency of a link e: <$c_e$, $u_e$, $d_e$>. In general, link state can be a function of time domain. For example, link capacity may change in some networks (e.g., a wireless network, whose channel capacity may vary depending of environment). However, in many studies, they can be assumed static.

A flow is a data transmission session in the network. It involves a set of network nodes as sources or destinations of the transmission. Usually, a flow has certain attributes such as cost, bandwidth, and latency. Therefore, given a flow set F of m flows, each flow $f_i$, i ∈ [1, m], can be noted as $f_i$=($s_i$, $M_i$, $\dot{c}_i$, $d_i$, $b_i$), where $s_i$ is the source node, $s_i$ ∈ V, $M_i$ is the set of member nodes, $M_i$⊆V, $\dot{c}_i$ is the cost bound, $d_i$ is the latency bound, and $b_i$ is the bandwidth demand. Although the above notation considers only a single source, it is readily understood that a flow of multiple sources can be decomposed into multiple single-source flows.

Figure 3:
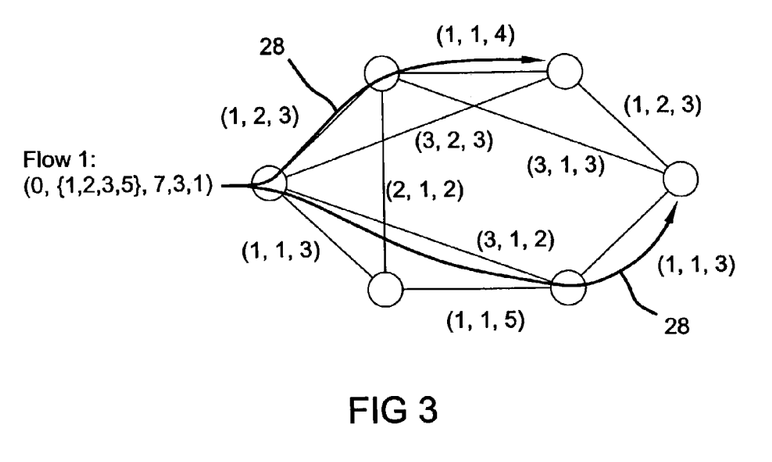
FIG. 3 illustrates another exemplary directed graph model along with associated link states.

FIG. 3 illustrates the modeling of an exemplary network in accordance with this notation. Each link is associated with a link state of (cost, delay, capacity). These link states may also be represented in separate matrices. Given an example flow, with node 0 as the source node and destination nodes {1, 2, 3, 5}, the cost is bounded by 7, delay is bounded 3 and bandwidth demand is 1. In this case, a multicast tree can be constructed with the links designated at 28, which satisfies the flow specification.

In view of the network requirements and assumptions discussed above, we may conclude some facts that may help us address surveillance flow routing. One important fact is that large amount of flows are applied to a small network. One phenomenon becomes noticeable: many flows will share the same flow pattern. Suppose a network of six backbone routers, nodes are labeled as $v_1$, $v_2$, $v_3$, $v_4$, $v_5$, and $v_6$. Considering only these six nodes, there are six possible source nodes. Suppose $v_1$ is the source node, the possible sets of members can be enumerated as: { $v_2$}, { $v_3$}, ..., { $v_2$, $v_3$}, ..., { $v_2$, $v_3$, $v_4$, $v_5$, $v_6$}. Each set corresponds to a unique flow pattern. Therefore, considering each node to be a potential source node, then number of possible flow patterns is:

$$6^* \left( \binom{5}{1} + \binom{5}{2} + \binom{5}{3} + \binom{5}{4} + \binom{5}{5} \right) = 186.$$

Even if we have 400 flows rooted from these six nodes evenly, at least every two flows will have a same flow pattern. This phenomenon can be more serious if 400 flows are rooted from only a part of the network nodes. On the other hand, we should also note that for multicast flows, there is a great probability that multiple routes exist for a flow having the same hop-count.

Figure 4:
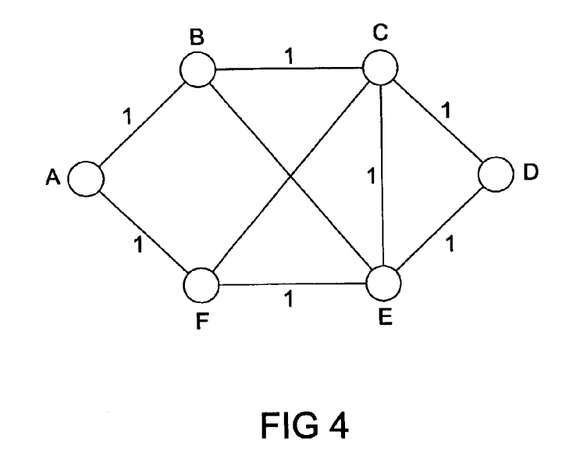
FIG. 4 illustrates yet another exemplary directed graph model.

FIG. 4 illustrates a graph which represents a portion of the topology of an exemplary surveillance network. In the network topology shown, suppose a flow pattern from source A and to destinations D and E, we may find that even considering least cost routing, there are six paths available for this flow pattern. This is a big pool for a routing algorithm to select the least congested path. In addition, note that there are other paths available with more hop counts. Consider that links B-E, F-C, C-E, and E-C become congested, links E-D, D-E, C-D, D-C may be chosen when necessary, e.g. (A-B, B-C, C-D, D-E), with one extra hop. In other words, a routing algorithm will preferably select non-optimum paths when optimum paths are no longer available (due to congestion, for example). Hence, if we pay attention to guiding flows with a same pattern into different paths, link congestions may be effectively avoided.

Figure 5:
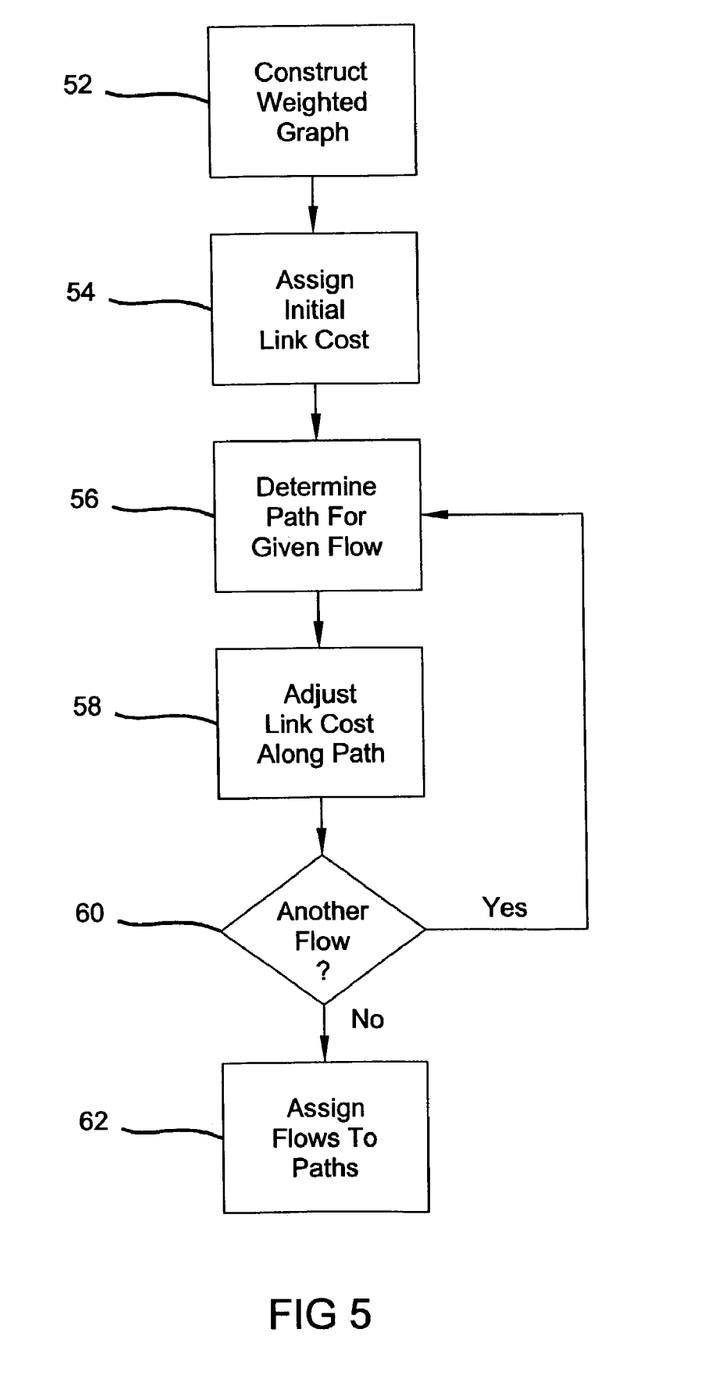
FIG. 5 is a flowchart depicting a load adaptive cost algorithm in accordance with the present invention.

Referring to FIG. 5, a routing algorithm is described that can dynamically adapt link cost to the link load in accordance with the present invention. In particular, the load adaptive cost routing algorithm adjusts link costs based on the load on every link such that the link cost for a given link increases when more load is assigned to the given link. In this way, link congestion may be minimized and/or effectively avoided.

Given a multicast network, a weighted graph is first constructed at 52 which represents the topology of the network. A link cost is then assigned at step 54 for each link in the network. Link cost is a generic metric used for routing. Most routing algorithms compute flow paths according to the costs assigned to network links. In the presently preferred embodiment, the link cost for each link is initially set to some predefined value which is correlated to bandwidth utilization of the link. However, link cost can have different meanings in different scenarios. For instance, link cost may indicate hop-count, such that minimum cost routing generally means to minimize hop-count. In another instance, link cost can be associated with meanings induced from monetary or administrative policies. It is readily understood that these different meanings or combinations thereof for link cost are also within the broader aspects of the present invention.

Next, a path is determined for a given flow at step 56 based on link cost and bandwidth constraints. Given a graph representative of the network topology, determining such a path is analogous to a Steiner Tree problem. When the network is small, an exact search algorithm is preferably used. On the other hand, when the network is relatively large, searching for exact solutions becomes intractable and thus a heuristic approach should be used. In either case, the result of the tree solving algorithm is an identified path for the given flow. It is readily understood that the present invention does not depend on the particular Steiner tree solving algorithm.

Two exemplary Steiner Tree solving algorithms are further described below. An exact Steiner Tree search algorithm is as follows:

```
Input:
    Graph G=(V,E)
    Root node r∈ V
    Destinations: D ⊂ V, r∉ D
Pre-processing:
            Let Δ:=D∪{r}
            Let S:=V\Δ, S ⊂ V, (Denote as: S={s_j, j=[1,|S|]})
            Let m:=|S|
            Let Π:={{s_1},{s_2},..., {s_1,s_2},..., {s_1,s_2,..., s_m}}
            (All possible combinations of nodes in S, denoted as
            Π:={π_i, i=[1,|Π|]})
            Let k:=|Π|
Begin
    1.      Let Γ:=∅
    2.      Let c:=∞
    3.      Let i:=0
```

```
    4.      DO
    5.          Derive G'=(Δ, E') from G
    6.          Find Directed Minimum Spanning Tree T on G'
    7.          Let t:=Cost(T) (Cost of T, hop count)
    8.          If c>t then
    9.              Let Γ:= T
    10.             Let c:=t
    11.         Let i:=i+1
    12.         Let Δ:= Δ∪π_i
    13.     Until i>k
    14.     Output Γ
End
```

Briefly, given a graph G=(V, E), and a set M of member nodes (including a source node and at least one destination node), the algorithm builds new graphs G' which contains member nodes and zero or more nodes in V\M. The exact search algorithm then finds the minimum spanning trees on these new graphs, the one with smallest cost is the exact Steiner tree. This algorithm is not polynomial since it has to enumerate all combinations of V\M. For a small size network, an exhaustive search is computational feasible.

An exemplary heuristic algorithm is also described. In particular, the known KMB algorithm is set forth below:
INPUT: An undirected graph G=(V, E) and a set of Steiner Points S ⊆ V.
OUTPUT: A Steiner Tree TH for G and S.
BEGIN
1. Construct the complete undirected graph G1=(V1, E1) from G and S, in such a way that V1=S, and for every {vi, vj}∈E1, the weight (length/cost) on the edge {vi, vj} is equal to the length of the shortest path from vi to vj.
2. Find the minimal spanning tree T1 of G1. (If there are several minimal spanning trees, pick an arbitrary one.)
3. Construct the subgraph Gs of G by replacing each edge in T1 by its corresponding shortest path in G. (If there are several shortest paths, pick an arbitrary one.)
4. Find the minimal spanning tree Ts of Gs. (If there are several minimal spanning trees, pick an arbitrary one.)
5. Construct a Steiner Tree TH, from Ts by deleting edges in Ts, if necessary, so that all the leaves in TH are Steiner points.
END The key idea of this algorithm is to build a virtual graph G'. This graph is a fully connected graph: the nodes contain the member nodes only, while the links are associated with the distances obtained from the original graph. The minimum spanning tree is computed on the virtual graph. Afterwards, this virtual tree is mapped onto the original graph to obtain the final heuristic solution. While two particular Steiner tree solving algorithms have been described above, it is readily understood that other Steiner tree solving algorithms may be used and thus fall within the scope of the present invention.

To account for bandwidth constraints, the load adaptive cost algorithm preferably builds a virtual graph. To build the virtual graph, links which do not meet the bandwidth requirement for the given flow are discarded. In addition, orphan nodes (i.e., nodes having no links) are also removed from the graph, thereby creating a virtual graph which accounts for bandwidth constraints. The virtual graph may then serve as input to the tree solving algorithm. Alternatively, the link cost for each link which does not meet the bandwidth requirement may be set to substantially larger value, thereby effectively removing the link from further consideration. In this way, a path is determined for a given flow that accounts for bandwidth constraints.

Once a flow is assigned a path in the network, the link cost associated with each link along the path is adjusted at step 58, such that the adjusted cost accounts for the load traversing the respective link. Increasing the link cost encourages the algorithm to select other links in subsequent iterations, thereby distributing the link assignment across the network. However, the link cost increase is a relatively small amount each time, so that the cost will never exceed some bound, $\hat{C}$. In one exemplary embodiment, the bound may be defined as a function of the network topology. For example, the link cost may be increased by some incremental cost whose accumulation will not exceed $1/|E|$, where $|E|$ is the number of links (also referred to as edges) in the network. Alternatively, the incremental cost may be bound by $1/|V|$, where $|V|$ is the number of nodes in the network. Therefore, the load adaptive cost algorithm still favors a least hop route when such a route exists. The effects of dynamically adjusting the link cost in this manner are further described below.

The step of determining a path and adjusting the link cost are then repeated for each of the remaining flows in the network as shown at step 60. Once a path has been determined for each flow, the flows are assigned to the identified paths at step 62, thereby providing a path management approach which accounts for bandwidth constraints in a multicast network environment.

Figure 6A:
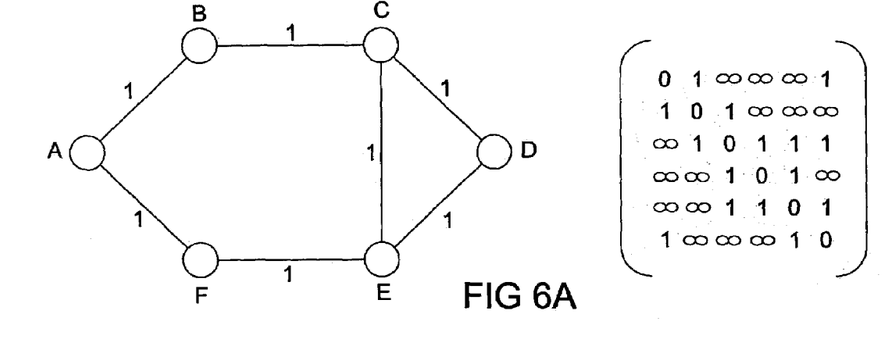
FIGS. 6A and 6B illustrate exemplary flow assignments by the load adaptive cost algorithm of the present invention.
Figure 6B:
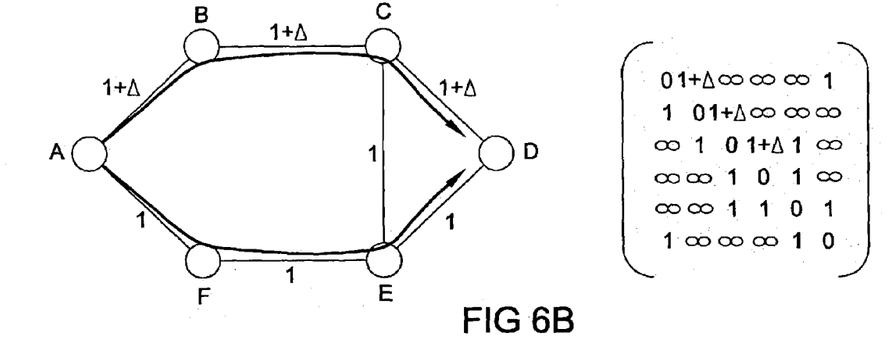

Referring to FIG. 6A, every link in the graph is initially assigned a cost of one. When one flow between A and D is assigned on link A-B, B-C, and C-D, costs on these links are increased each by $\Delta$ respectively. This link cost adjustment affects the subsequent assignment of a second flow having the same source A and the same destination D. The second flow will be assigned another path composed by links A-F, F-E and E-D as shown in FIG. 6B. This mechanism of dividing same pattern flows onto different paths is one of the key ideas for the load adaptive cost algorithm of the present invention.

Figure 7:
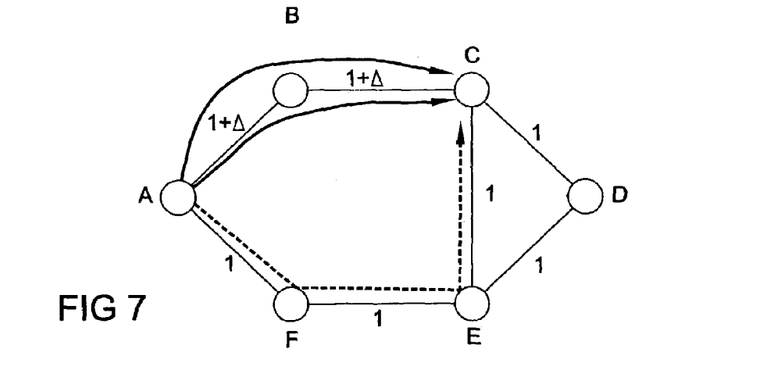
FIG. 7 illustrates another exemplary flow assignment by the load adaptive cost algorithm of the present invention.

When the cost of a link is increased big enough, it may lead to the assignment of routes with bigger hop-counts. For example, suppose there are two flows from node A to node C as shown in FIG. 7. Further suppose that each link can accommodate at least 2 flows. We may assign both flows to link <A, B> and <B, C>, or alternatively, assign one to <A, B> and <B, C>, and assign the other to <A, F>, <F, E>, <E, C>.

In accordance with the load adaptive cost algorithm, if we assign flow number one to <A, B> and <B, C> and then make the corresponding cost adjustments on these links, the link cost for <A, B> is $1+\Delta_1$, and the link cost for <B, C> is $1+\Delta_2$. Prior to assigning the second flow, path <A, B, C> has a link cost of $2+\Delta_1+\Delta_2$, and path <A, F, E, C> has a link cost of 3. If $\Delta_1+\Delta_2<1$, then second flow will be assigned to path <A, B, C>; otherwise, path <A, F, E, C> will be selected. Since the load adaptive cost algorithm intends to minimize the total hop-count, then between the above two assignment alternatives, the first one is the desirable selection. In other words, when link capacity allows, the load adaptive cost algorithm of the present invention should choose the path of least hop-count. Along with diverting flows among same hop-count paths, these are the two key design concepts of the load adaptive cost algorithm.

To achieve these two design concepts, the following four criteria must be satisfied. First, the cost increase on an individual link shall never exceed 1. Second, considering multiple flows are assigned, cumulative cost increase after multiple flows are assigned to a link shall always be kept below 1. Third, not only should a single link cost increase be restrained below 1, but also the sum of link cost increases on any path shall not exceed 1. Fourth, link adjustment mechanism shall be an increasing function whose value increases with load.

Mathematically, for any link e: $\forall e \in E$, after a flow is assigned to this link, the cost adjustment may be: $c_e(t)=c_e(t-1)+\Delta$, $\Delta>0$. According to the discussion above, $0<\Delta<<1$. However, the solution is not unique. In one exemplary approach, the cost adjustment mechanism may be defined as a function of the data transmission sessions, bandwidth demand, link capacity, and network topology. In this instance, the adjustment mechanism for determining $\Delta$ may be as follows:

$$\Delta = \frac{bi\,\hat{c}}{u_e|F|}$$

where $b_i$ is the bandwidth demand of the newly assigned flow, $u_e$ is the capacity of the link, and $|F|$ is the total number of flows. Alternatively, the cost adjustment mechanism may also be a function of previous cost adjustment value as follows:

$$\Delta = \frac{bi\,\hat{c}}{u_e|F|}c_e(t-1)$$

It should be noted that each of these exemplary adjustment mechanisms satisfy all of above described criteria. However, it is readily understood that other adjustment mechanism which meet these four criteria are also with the scope of the present invention.

An exemplary embodiment of the load adaptive cost algorithm is set forth below.

```
Input:
    Graph G:=(V,E).
    Link capacity: C:={c_e: e∈E}.
    Number of flows: N
    Flows: F:={f_i=(s_i, D_i, b_i), s_i∈V, D_i⊆V, b_i∈P⁺, i∈[1,N]}.
Begin
    1.   Let i:=1
    2.   ∀ e∈E, Let cost_e:=1.0
    3.   Let Γ:=∅
    4.   Do until i>N:
    5.       Find G'=(V,E'), such that ∀ e'∈ E', c_e' ≧ b_i.
    6.       Find Steiner Tree T_i on G', which roots from {s_i}
             and reaches all nodes in D_i
    7.       Let Γ:= Γ ∪ {T_i}
    8.       Compute Δ
    9.       ∀ e∈T_i, Let cost_e := cost_e+Δ
    10.      ∀ e∈T_i, let c_e:=c_e-b_i
    11.      Let i:=i+1
    12. Output Γ
End
```

Although this embodiment is presently preferred, it is not intended as a limitation of the broader aspects of the present invention.

The load adaptive cost algorithm set forth above assumes a given order in which a flow was assigned a path. However, varying the order in which flows are assigned will result in flow assignments having different global bandwidth utilization. Thus, the load adaptive cost algorithm may be repeated for different flow orders, thereby further minimizing the global bandwidth utilization across the network.

Figure 8:
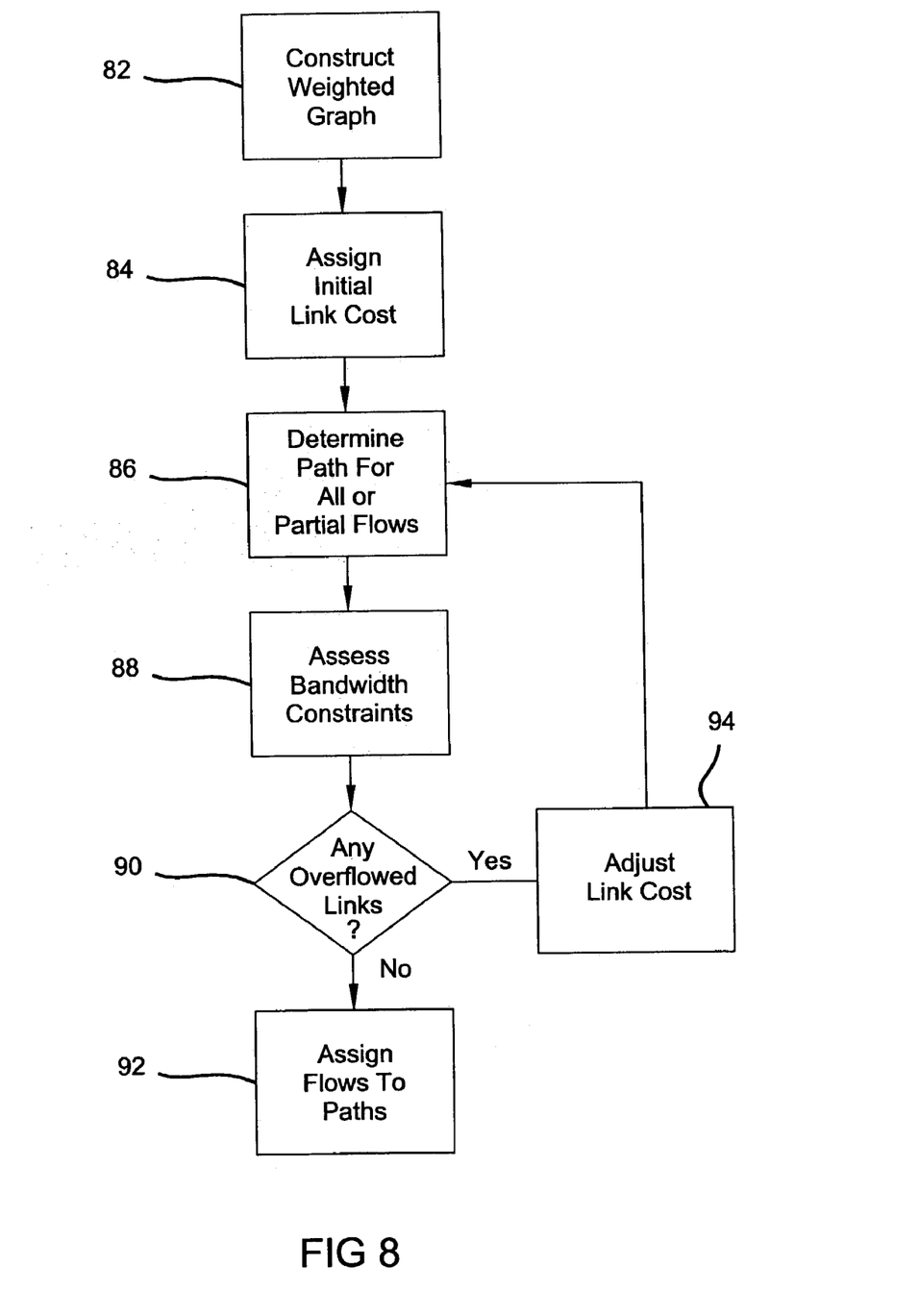
FIG. 8 is a flowchart depicting an iterative cost adjustment algorithm in accordance with another aspect of the present invention.

For example, a first flow order is selected. The load adaptive cost algorithm is then applied to the selected flow order. In addition, the total global bandwidth utilization is computed for the resulting assigned flow paths. The load adaptive cost algorithm may be further applied to different flow orders. For each subsequent iteration, the flow order may be randomly chosen or designated by a network specialist. It is envisioned that load adaptive cost algorithm may be applied to each possible combination of flow orders or merely repeated for some predetermined iteration bound. In either case, the total global bandwidth utilization value from each iteration are compared. The resulting assigned flow path having the smallest total global bandwidth utilization value is selected, thereby further minimizing the global bandwidth utilization across the network In accordance with another aspect of the present invention, an iterative cost adjustment algorithm is also presented as shown in FIG. 8. As a starting point, a weighted graph which represents the topology of the network is constructed at step 82 and a link cost is assigned for each link in the network at step 84.

Next, potential network paths for all flows (or some flows selected according to certain selection criteria) are identified at step 86 without consideration of network bandwidth limitations. In a preferred embodiment, a network path for a given flow is determined by solving the Steiner tree problem, where each Steiner tree roots from a source node associated with the given flow and reaches each destination node associated with the given flow. As noted above, various known Steiner tree solving algorithms may be used and thus fall within the scope of the present invention. It is envisioned that for subsequent iterations, paths may be determined for only a portion of the flows.

After a network path has been identified for each flow, the algorithm then assesses network bandwidth limitations at step 88. To do so, total bandwidth is determined for each link and links are identified, where the total bandwidth of an identified link exceeds bandwidth capacity of the identified link. When no such links are identified, each flow is assigned at 92 to its previously identified network paths.

On the other hand, when one or more such links are identified, link costs are adjusted at step 94 and the previous steps are repeated until no overflowed links are identified.

Because assignments of iterations could oscillate between iterations, the algorithm may not converge. For example, link A could be overflowed after iteration n is finished. When the cost of this link is then updated, some flows that are assigned to this link may be assigned to link B at iteration n+1, resulting in an overflow of link B. It is then possible that after cost of link B is updated in iteration n+2, link A is overflowed again. To avoid this, it is envisioned that a limit may be placed on the number of iteration times. Once the iteration limit is reached, the algorithm would be discontinued.

An exemplary embodiment of the iterative cost adjustment algorithm is set forth below.

Input:
    Graph G:=(V,E).
    Link capacity: C:={$c_e$: e∈E}.
    Number of flows: N
    Flows: F:={$f_i$=($s_i$, $D_i$, $b_i$), $s_i$∈V, $D_i$⊆V, $b_i$∈$P^+$, i∈[1,N]}.

-continued

Figure 9:
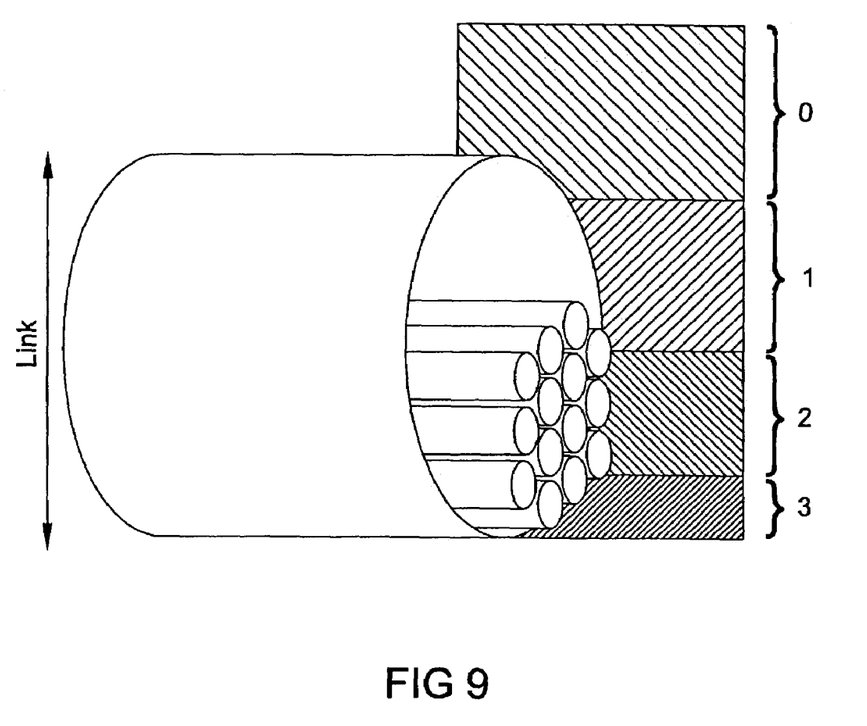
FIG. 9 illustrates categorizing flows on a congested link in accordance with the present invention.

Begin
    1.  Let i:=1
    2.  ∀ e∈E, Let $cost_e$:=1.0
    3.  Let Γ:=∅
    4.  Do until i>maximum_iteration_total:
    5.      Find Steiner Trees Γ, which includes all trees for all flows.
    6.      Calculate total bandiwidth on every link, Let $L_i$ be the set includes all the overflowed links.
    7.      If $L_i$:=∅, break and go to step 10
    8.      Compute Δ
    9.      ∀ e∈$L_i$, Let $cost_e$ :=$cost_e$+Δ
    10.   Let i:=i+1
    11.  If i<maximum_iteration_total, Output Γ
End A technique to improve convergence of this algorithm is described below. Conceptually, when a link is overflowed, flows assigned to this link can be categorized into different classes as shown in FIG. 9. For instance, flows can be categorized in classes according to its future cost increase, where some flows can be detoured to other links without increasing the cost (let us refer this class as class 0), and other flows can be detoured to other links but at the price of a cost increase by 1, 2, . . . , and n (referred to as class 1, 2, . . . , n). Thus, if we first increase the cost of an overflowed link by n-1, then only those class-n flows will remain on this link. The link cost is then gradually reduced so that other classes can be assigned back to this link until the capacity is almost full.

Procedurally, mark all the flows which are assigned to an overflowed link i. Reassign only the marked flows. Specifically, increase the cost of link i by "n" (in the case of figure above, n=3) and reassign all the marked flows to minimize the routing cost of each flow. If a flow is still assigned to link l, then increase the cost of link i by Δ (e.g., Δ=flow bandwidth divided by link bandwidth) and unmark that flow. After all of the marked flows are reassigned, if there is some remaining capacity of link i, then decrease the cost of link i by 1, and repeat the procedure.

Since this is a conceptual approach, there remains some implementation issues. First, we cannot predict how much extra cost there will be for any flow. Therefore, we can only start from the biggest possible number, which is |V|-1 (because the maximum path length is |V|-1, recall that |V| is the number of network nodes). However, as the iterations go on, this number will increase which makes it difficult to track due to multiple links could overflow after the same iteration. In addition, multiple flows may have the same path and cannot be divided by the previously described iterative cost adjustment algorithm.

An iterative cost adjustment algorithm that addresses these issues is presented below. In this enhanced iterative cost adjustment algorithm, one link is adjusted at a time. In each iteration, only one overflowed link is chosen to have its cost updated. The algorithm then goes through a cost search procedure to update the cost. Basically, it initially assigns a big cost to the link, and then tests if a reassignment will cause it to overflow. If not, the cost is decreased by 1 and the link assignment is tested again until the test assignment overflows. When overflowed at a cost of x, we know that the proper link cost should be x+1. Thus, the link cost is finally assigned as x+1.

To overcome the difficulty of dividing flows having of same path, the link cost is increased after each marked flow is reassigned in a manner similar to the load adaptive cost algorithm described above. In other words, the increase is proportional to the load on the link. This approach breaks the oscillation that occurs in most of the assignment cases.

A particular embodiment of this enhanced algorithm is set forth below.

```
Input:
    Graph G:=(V,E).
    Link capacity: C:={c_e: e∈E}.
    Number of flows: N
    Flows: F:={f_i=(s_i, D_i, b_i), s_i∈V, D_i⊆V, b_i∈P⁺, i∈[1,N]}.
Begin
    1.  Let i:=1
    2.  ∀ e∈E, Let cost_e:=1.0
    3.  Let Γ:=∅.
    4.  Do until i>maximum_iteration_total:
    5.      Mark all or partial flows
    6.      Assign all marked flows without bandwidth constraint
    7.      Un-mark all flows
    8.      Find ONE overflowed link e, if none, Stop
    9.      UpdateCost(e)
    10.     i := i+1
End
```

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for performing path management for a plurality of select data transmission sessions in a multicast network, the network having a plurality of nodes interconnected by a plurality of links, comprising:
   (a) constructing a weighted graph which represents topology of the network;
   (b) assigning a cost to each link in the network;
   (c) determining a path for a given data transmission session based on link cost and bandwidth utilization;
   (d) adjusting link cost associated with each link along the path, such that the adjusted link cost accounts for load on the respective link and the link cost for each link along the oath is increased by an incremental cost whose accumulation will not exceed a bound defined as $\hat{C}=1/|E|$, where the bound is a function of at least the network topology and $|E|$ is a number of edges in the weighted graph; and
   (e) repeating steps (c) and (d) for the remaining data transmission sessions, thereby assigning a set of flow paths for each of the plurality of selected data transmission sessions.

2. The method of claim 1 wherein the step of constructing a weighted graph further comprises constructed a weighted, directed graph.

3. The method of claim 1 wherein the step of adjusting link cost minimizes global bandwidth utilization for the plurality of select data transmission sessions.

4. The method of claim 1 wherein the step of adjusting link cost further comprises increasing link cost for a given link along the path by an incremental cost, where the incremental cost is a function of at least one of the total number of transmission sessions, bandwidth demand, link capacity, network topology and a previous cost adjustment to the link cost.

5. The method of claim 1 wherein the step of adjusting link cost further comprises increasing link cost for a given link along the path by an incremental cost, $\Delta$, where $$\Delta = \frac{b_i \hat{c}}{u_e |F|}$$

such that $b_i$ is bandwidth demand of the given data transmission session, $u_e$ is capacity of the given link, and $|F|$ is the total number of data transmission sessions.

6. The method of claim 1 wherein the step of assigning a cost to each link further comprises setting the cost to one for each link.

7. The method of claim 1 wherein the step of determining a path further comprises selecting an optimum path with regard to link cost and bandwidth utilization.

8. The method of claim 1 wherein the step of determining a path further comprises finding a Steiner tree for the given data transmission session, where the Steiner tree roots from a source node associated with the given data transmission session and reaches each destination node associated with the given data transmission session.

9. The method of claim 8 further comprises building a virtual graph by discarding links from the weighted graph which do not meet bandwidth requirement of the given data transmission session and removing orphan nodes from the weighted graph, prior to the step of finding a Steiner tree.

10. The method of claim 8 wherein the step of finding a Steiner tree further comprises using a Kou, Markowsky and Berman (KMB) algorithm.

11. The method of claim 8 wherein the step of finding a Steiner tree further comprises enumerating all possible trees and selecting an optimum tree having a least cost value.

12. The method of claim 1 further comprises determining a total global bandwidth utilization value for the set of assigned flow paths.

13. The method of claim 12 further comprises re-ordering the plurality of selected data transmission sessions and repeating steps c) through (e) for the re-ordered plurality of selected data transmission sessions, thereby assigning a second set of flow paths for each of the plurality of selected data transmission sessions.

14. The method of claim 13 further comprises determining a total global bandwidth utilization value for the second set of assigned flow paths; and selecting the set of assigned flow paths having a smaller total global bandwidth utilization value, thereby minimizing the global bandwidth utilization.

15. The method of claim 1 wherein the multicast network is further defined as an IP-based surveillance network.

16. A load adaptive cost algorithm for routing a select data transmission session in a multicast network, the network having a plurality of nodes interconnected by a plurality of links, comprising:
   constructing a virtual graph from a weighted graph which represents the topology of the network by discarding links from the weighted graph which do not meet bandwidth requirement associated with the select data transmission session and removing orphan nodes from the weighted graph;
   finding a Steiner tree for the select data transmission session, where the Steiner tree roots from a source node associated with the select data transmission session and reaches each destination node associated with the select data transmission session, thereby identifying a path for the select data transmission session; and
   adjusting link cost associated with each link along the path, such that the adjusted link cost accounts for load on the respective link and the link cost for each link along the oath is increased by an incremental cost , $\Delta$, whose accumulation will not exceed a bound, $\hat{C}$, where the bound is a function of at least the network topology and $$\Delta = \frac{b_i \ \hat{c}}{u_e |F|}$$

such that $b_i$ is bandwidth demand of the select data transmission session, $u_e$ is bandwidth capacity of the given link, and $|F|$ is a total number of data transmission sessions.

17. The method of claim 16 wherein the step of constructing a virtual graph further comprises constructing the virtual graph from a weighted, directed graph.

18. The algorithm of claim 16 wherein the bound is defined as $\hat{C}=1/|E|$, where $|E|$ is a number of edges in the weighted graph.

19. The algorithm of claim 16 wherein the bound is defined as $\hat{C}=1/|V|$, where $|V|$ is a number of nodes in the weighted graph.

20. The algorithm of claim 15 wherein the step of adjusting link cost further comprises increasing link cost for a given link along the path by an incremental cost, where the incremental cost is a function of the total number of transmission sessions, bandwidth demand, link capacity, network topology and a previous cost adjustment to the link cost.

21. A method for performing path management for a plurality of select data transmission sessions in a multicast network, the network having a plurality of nodes interconnected by a plurality of links, comprising:
   (a) constructing a weighted graph which represents topology of the network;
   (b) assigning a cost to each link in the network;
   (c) determining a path for a given data transmission session based on link cost and bandwidth utilization;
   (d) adjusting link cost associated with each link along the path, such that the adjusted link cost accounts for load on the respective link and the link cost for each link along the path is increased by an incremental cost whose accumulation will not exceed a bound defined as $\hat{C}=1/|V|$, where the bound is a function of at least the network topology and $|V|$ is a number of nodes in the weighted graph; and
   (e) repeating steps (c) and (d) for the remaining data transmission sessions, thereby assigning a set of flow paths for each of the plurality of selected data transmission sessions.

22. A method for performing path management for a plurality of select data transmission sessions in a multicast network, the network having a plurality of nodes interconnected by a plurality of links, comprising:
   (a) constructing a weighted graph which represents topology of the network;
   (b) assigning a cost to each link in the network;
   (c) determining a path for a given data transmission session based on link cost and bandwidth utilization;
   (d) adjusting link cost associated with each link along the path, such that the adjusted link cost accounts for load on the respective link and the link cost for each link along the path is increased by an incremental cost , $\Delta$, whose accumulation will not exceed a bound, where $$\Delta = \frac{b_i \ \hat{c}}{u_e |F|} c_e(t-1),$$

such that $b_i$ is bandwidth demand of the given data transmission session, $c_e(t-1)$ is a previous incremental cost value, $u_e$ is capacity of the given link, and $|F|$ is the total number of data transmission sessions; and
   (e) repeating steps (c) and (d) for the remaining data transmission sessions, thereby assigning a set of flow paths for each of the plurality of selected data transmission sessions.

23. A load adaptive cost algorithm for routing a select data transmission session in a multicast network, the network having a plurality of nodes interconnected by a plurality of links, comprising:
   constructing a virtual graph from a weighted graph which represents the topology of the network by discarding links from the weighted graph which do not meet bandwidth requirement associated with the select data transmission session and removing orphan nodes from the weighted graph;
   finding a Steiner tree for the select data transmission session, where the Steiner tree roots from a source node associated with the select data transmission session and reaches each destination node associated with the select data transmission session, thereby identifying a path for the select data transmission session; and
   adjusting link cost associated with each link along the path, such that the adjusted link cost accounts for load on the respective link and the link cost for each link along the path is increased by an incremental cost , $\Delta$, whose accumulation will not exceed a bound, $\hat{C}$, where the bound is a function of at least the network topology and $$\Delta = \frac{b_i \ \hat{c}}{u_e |F|} c_e(t-1),$$

such that $b_i$ is bandwidth demand of the given data transmission session, $c_e(t-1)$ is a previous incremental cost value, $u_e$ is capacity of the given link, and $|E|$ is the total number of data transmission sessions.

* * * * *

UNITED STATES PATENT AND TRADEMARK OFFICE
CERTIFICATE OF CORRECTION

| | | |
|---|---|---|
| PATENT NO. | : 7,246,172 B2 | Page 1 of 1 |
| APPLICATION NO. | : 10/455833 | |
| DATED | : July 17, 2007 | |
| INVENTOR(S) | : Harumine Yoshiba et al. | |

It is certified that error appears in the above-identified patent and that said Letters Patent is hereby corrected as shown below:

Col. 11, Line 43, Claim 1:
"oath" should be --path--
Col. 12, Line 38, Claim 13:
"c)" should be --(c)--
Col. 13, Line 2, Claim 16:
"oath" should be --path--
Col. 14, Line 53, Claim 23:
"/E/" should be --/F/--

Signed and Sealed this

Twenty-seventh Day of November, 2007

JON W. DUDAS
*Director of the United States Patent and Trademark Office*